United States Patent

[11] 3,572,637

| [72] | Inventor | James P. Mitchell, Jr.<br>14262 Oxford, Vectorville, Calif. 92392 |
|---|---|---|
| [21] | Appl. No. | 757,966 |
| [22] | Filed | Sept. 6, 1968 |
| [45] | Patented | Mar. 30, 1971 |

[54] AIRCRAFT CRASH RECOVERY HOIST
2 Claims, 22 Drawing Figs.

[52] U.S. Cl. .................................................. 254/139.1
[51] Int. Cl. ................................................... B66c 23/60
[50] Field of Search.......................................... 254/139,
134, 145; 214/1; 212/8, 59, 144

[56] References Cited
UNITED STATES PATENTS

| 985,645 | 2/1911 | Vollers | 254/139.1 |
|---|---|---|---|
| 2,569,628 | 10/1951 | Craighead | 254/139.1 |
| 3,160,288 | 12/1964 | Kelly | 214/1 |
| 3,433,459 | 3/1969 | Logan | 212/1 |

FOREIGN PATENTS

| 735,484 | 5/1943 | Germany | 254/139.1 |
| 914,202 | 6/1954 | Germany | 254/139.1 |
| 1,238,169 | 4/1967 | Germany | 254/139.1 |

*Primary Examiner*—Harvey C. Hornsby
*Attorneys*—Harry A. Herbert and Arthur R. Parker

ABSTRACT: An emergency aircraft-lifting-rig assembly having a main upright, rectangular-shaped supporting frame member supporting two spaced-apart lifting boom elements which, in turn, collectively support a pair of lifting pulley- and -cable systems. The latter are attached to a floating crossbeam member which is utilized to interconnect both pulley- and-cable systems with a main hoisting strap attached to the aircraft to be raised.

Patented March 30, 1971

INVENTOR.
JAMES P. MITCHELL, SR.
BY Harry A. Herbert Jr.
ATTORNEY

Arthur R. Parker
AGENT

Patented March 30, 1971

INVENTOR.
JAMES P. MITCHELL, JR.
BY Harry A. Herbert, Jr.
ATTORNEY

Arthur R. Parker
AGENT

Patented March 30, 1971
3,572,637
6 Sheets-Sheet 3
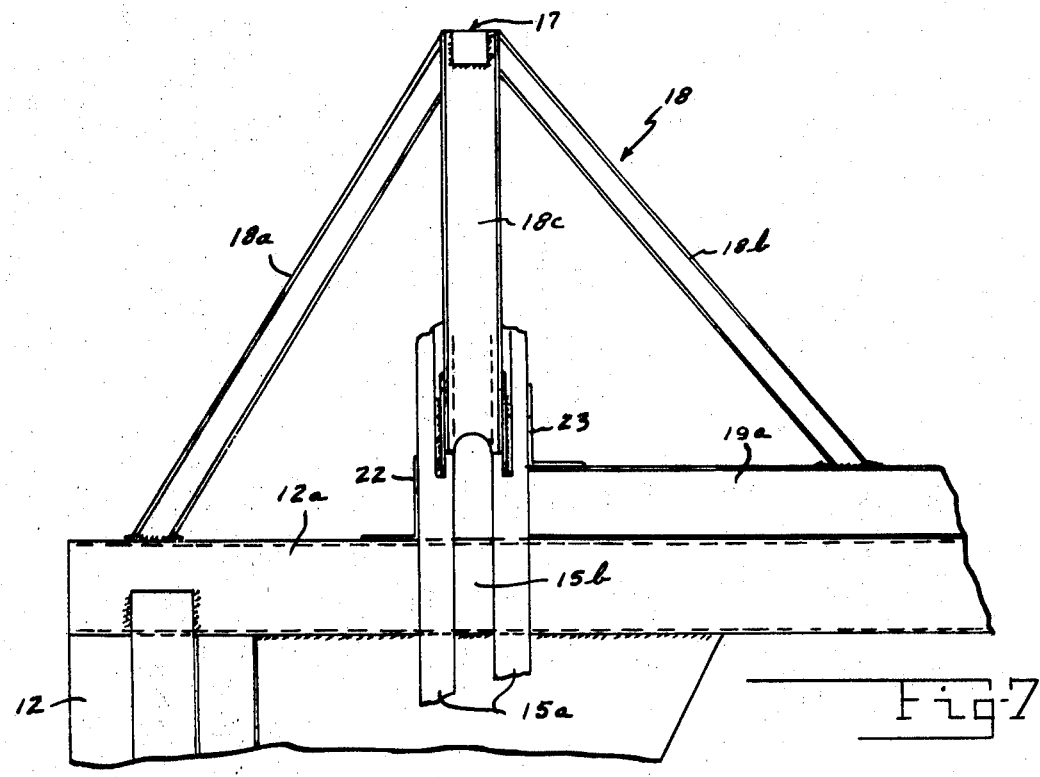
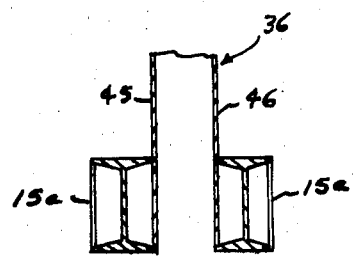
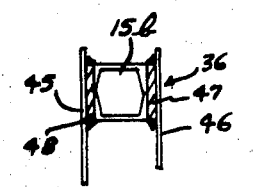
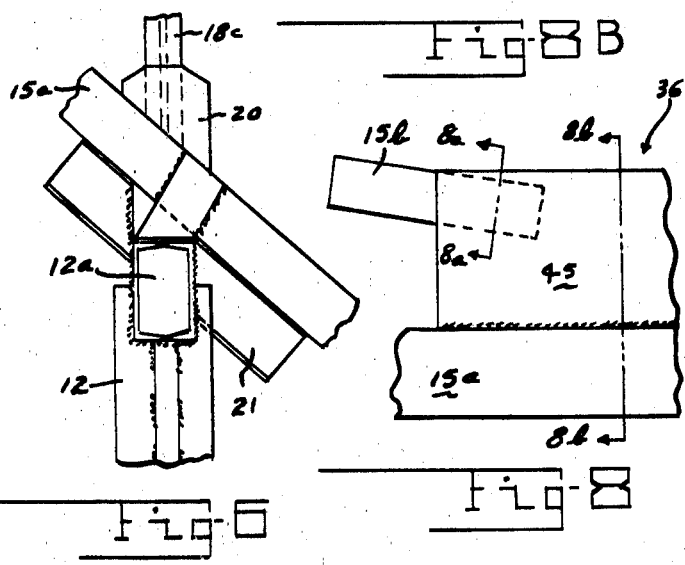
INVENTOR.
JAMES P. MITCHELL, JR.
BY Harry A. Herbert Jr.
ATTORNEY
Arthur R. Parker
AGENT Patented March 30, 1971

INVENTOR.
JAMES P. MITCHELL, JR.
BY Harry A. Herbert Jr.
ATTORNEY

Arthur R. Parker
AGENT

Patented March 30, 1971
3,572,637
6 Sheets-Sheet 5
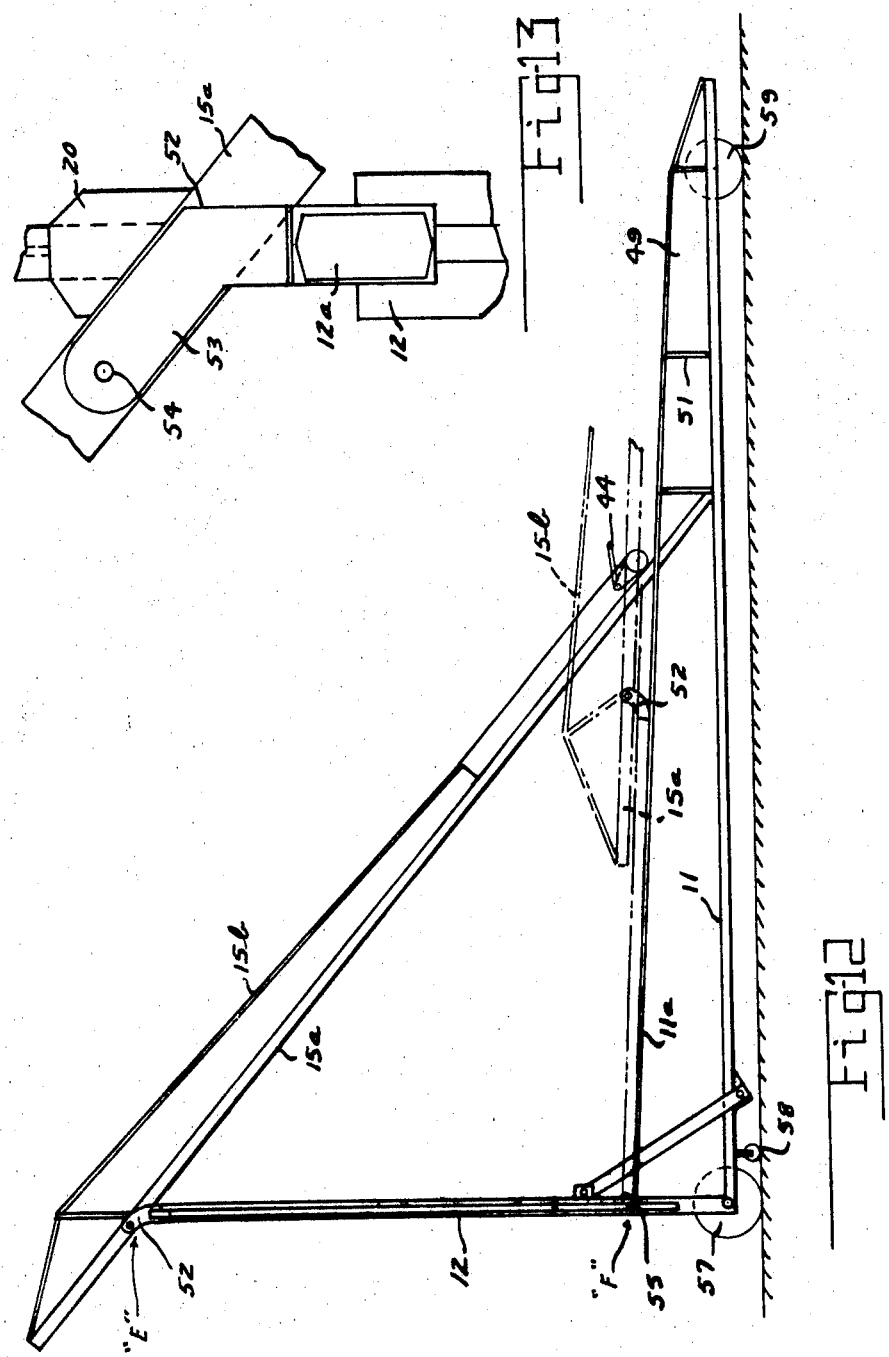

Patented March 30, 1971

INVENTOR.
JAMES P. MITCHELL
BY Harry A. Herbert Jr.
ATTORNEY

Arthur R. Parker
AGENT

3,572,637

AIRCRAFT CRASH RECOVERY HOIST

BACKGROUND OF THE INVENTION

This invention relates generally to the field of aircraft recovery and, more particularly, to the utilization of lifting or hoisting rigs adapted to remove crashed or disabled aircraft from the active portion of an aircraft runway.

In previous developments, a crippled or crashed aircraft obstructing the active portion of a runway was removed therefrom generally by means of a variety of bulldozers and/or large crane-types of equipment. These large vehicles have been used in the removal of the disabled aircraft normally either by means of pushing or lifting the aircraft out of the way. The latter operation has generally taken a least an hour to complete and, moreover, additional damage to the aircraft has frequently occurred.

The lifting or hoist system of the present invention was developed for the specific purpose of providing a suitable alternative to the above-mentioned methods by reducing the time required for such operations and eliminating the additional damage frequently resulting therefrom in a unique manner as will become readily apparent from the following summary and detailed description thereof.

SUMMARY OF THE INVENTION

The aircraft hoist system of the present invention consists basically of a base support member, a main rigid rectangular and upright frame support member affixed to said base support member, a pair of spaced-apart elongated and stationary boom elements each suspended at an upper end thereof from said main upright support member and each terminating at a lower supporting end portion in fixed relation with said base support member, and a floating crossbeam, or movable boom element suspended from each of said stationary boom elements by means of a pulley and cable arrangement formed in the upper end portion of each stationary boom element. The crossbeam or movable boom element may then be interconnected with the aircraft to be lifted by means of a series of load straps attached between the movable boom element and the crashed aircraft, and the latter raised by a hand-operated crank mechanism actuating the pulley and cable arrangements.

A principle object of the present invention resides in the provision of a new and improved aircraft lifting rig system that incorporates a relatively easily handled and yet unique main lifting support system that is both strong enough to raise fighter-type of aircraft from a disabled position on an aircraft runway, and also flexible and compact enough to facilitate both its movement to the correct position on the runway and interconnection with he aircraft to be lifted, and its transportation by standard transport aircraft.

A further object of the invention is in the development of an improved lifting rig assembly having a greatly simplified main lifting support means in combination with a unique load-lifting pulley and cable-actuating means adapted to be interconnected in novel manner with, and to lift the disabled aircraft and move it from the active runway portion in a substantially reduced time interval.

Other objects and advantages of the invention will appear obvious from the following disclosure thereof, in which:

BRIEF DESCRIPTION OF THE DRAWING

FIG. 6 is a third detailed view, partly broken away, more clearly showing the mounting between the main rigid upright, rectangular supporting member of the invention and each of the two stationary boom elements utilized therewith and generally illustrated at the arrow marked C in FIG. 3;

FIG. 7 is still another detailed view, partly broken away and relatively enlarged, illustrating details of the mounting means between the upper span of the main upright supporting member and each of the stationary boom elements of the invention (Note arrow C in FIG. 3);

FIGS. 8, 8a and 8b, respectively, represent additional detail views of the interconnection and/or attachment between the upper and lower boom element portions of each stationary boom member of the invention at the area generally marked by the arrow D in FIG. 3;

FIG. 12 represents a schematic view, in side elevation, of a modification of the invention of FIGS. 1 to 3, showing a collapsible form of the inventive lifting rig assembly;

FIG. 13 is a relatively enlarged and somewhat schematic view, illustrating details of a hinge mechanism to be utilized at the juncture marked E to assist in making the inventive form of FIG. 12 of a collapsible configuration;

DESCRIPTION OF THE PREFERRED EMBODIMENT

Figure 1:
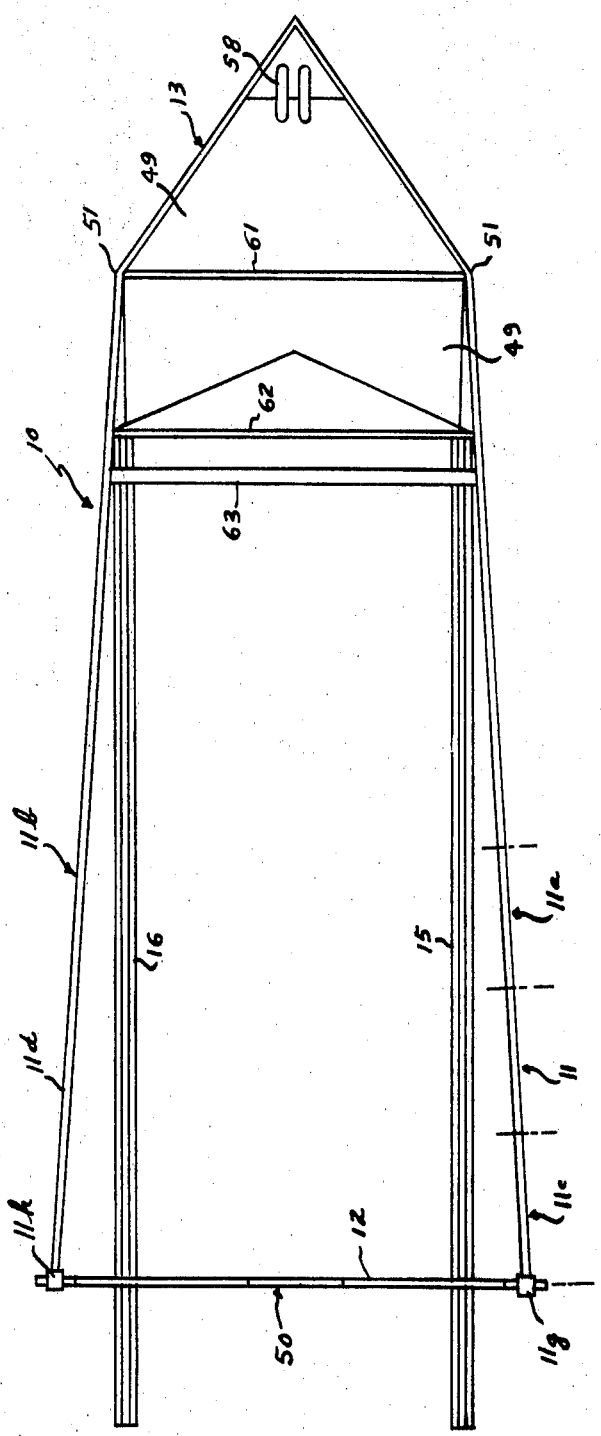
FIGS. 1, 2 and 3, respectively, represent plan, end and side elevational views, partly schematic in form, of the overall aircraft hoist or lifting rig assembly of the present invention.
Figure 1A:
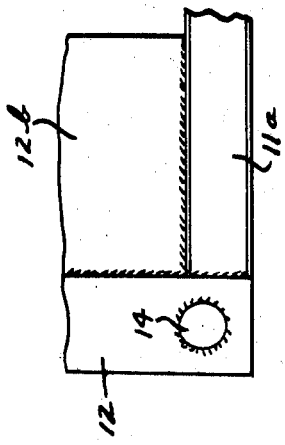
FIG. 1a represents a detailed view, in side elevation, illustrating more clearly the interconnection between the main upright rectangular supporting member and the base supporting member of the inventive hoist assembly, or in other words, the specific structural arrangement at the joint area indicated at the corner marked by the arrow T in FIG. 3.
Figure 3:
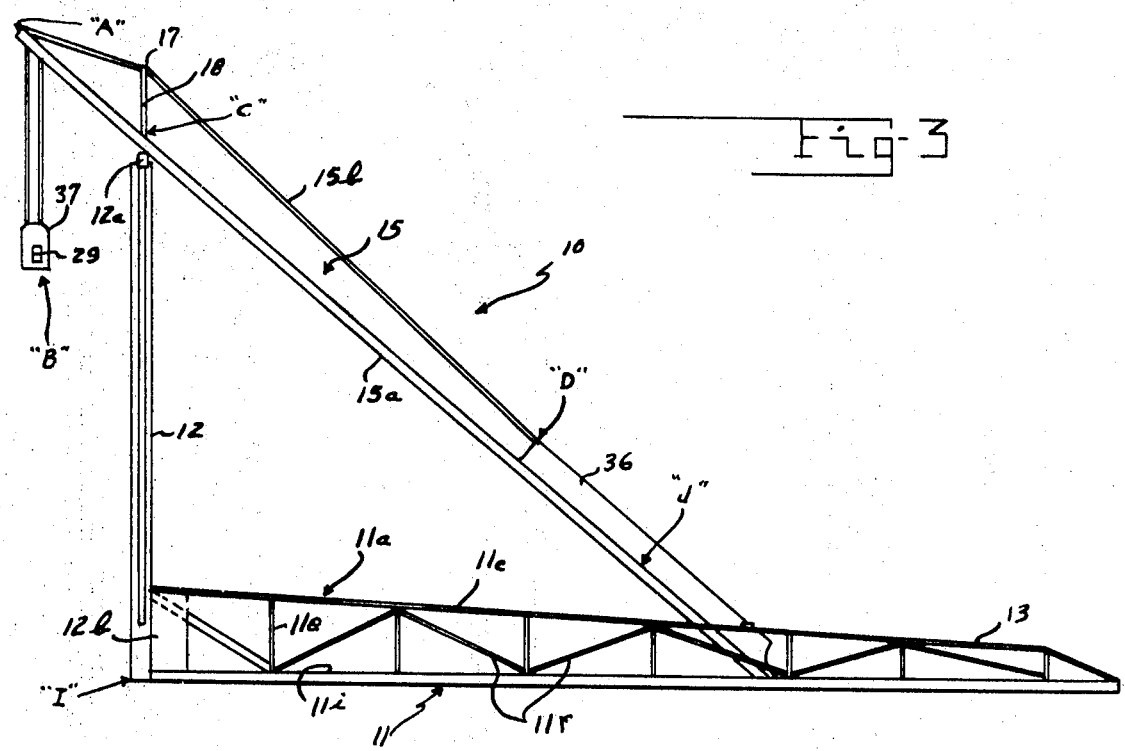
Figure 2:
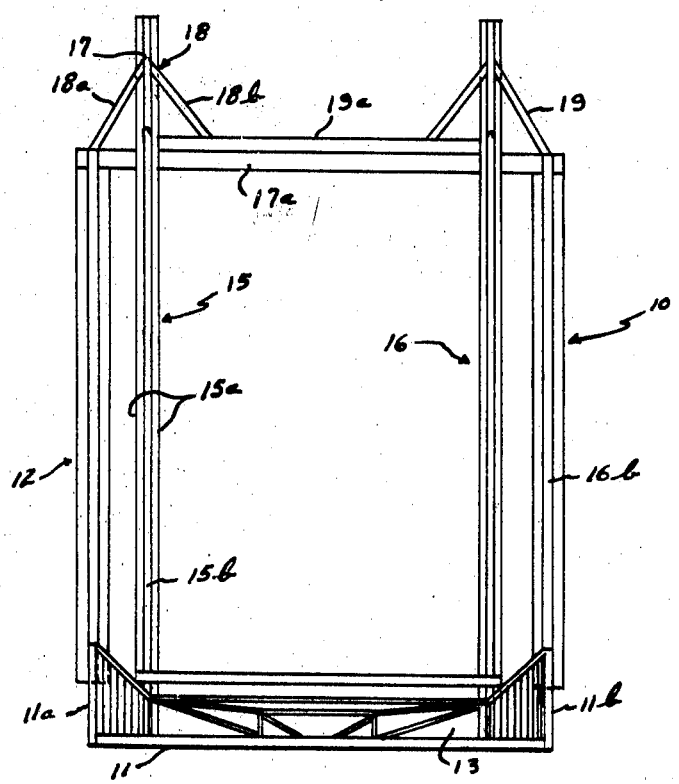
Figure 5:
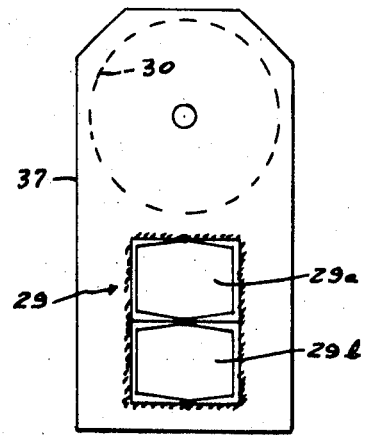
FIG. 5 is a second detailed view, more clearly illustrating the free-floating crossbeam, or movable boom element of the invention, generally indicated by the arrow marked B in FIG. 3.

Referring to the drawing and, in particular, to FIGS. 1 to 3 thereof, the aircraft crash recovery hoist or lifting rig assembly of the present invention is shown generally at 10 as basically including a base supporting member 11, a main upright, rectangular-shaped supporting frame member 12 rigidly attached at its bottom portion to the rearward end of said base-supporting member 11, and a forward or front end hoist assembly portion 13 which may be integrally formed with said base member 11, and attached to any appropriate tow vehicle. The base-supporting member 11 consists essentially of a pair of open-framework, side support elements, indicated respective at 11a and 11b which may be rigidly attached, or integrally formed with, the front assembly portion 13 at their forward ends. Side support elements 11a, 11b are additionally rigidly supported in a divergent configuration (note FIG. 1) at their rear ends to the opposite sides of the bottom span of said main upright supporting member 12. For this purpose, a pipe or similar rodlike, elongated transverse element is provided as seen at 14 in FIG. 1a. Actually, the aforesaid base-supporting member, side elements 11a and 11b each consist of the previously noted open framework that includes an upper support element indicated at 11c and 11d, respectively, for the left- and right-hand side support elements 11a and 11b. In addition, a lower support element is incorporated as indicated at 11i, for example, for the left-hand, side framework element 11a as seen in FIG. 2. The latter element 11a, which is identical to the right-hand element 11b, incorporates a series of generally regularly spaced, vertical support or rib elements 11e which extend between the upper and lower support elements 11c and 11i, and, in addition, a series of upwardly and downwardly directed diagonal support elements, as indicated at 11f are also included to provide additional support or bracing between the elements 11c and 11i. In this manner, a base support member is assured which is of relatively lightweight construction and yet is sufficiently strong to more than adequately support the aircraft to be lifted. To complete the required attachment or anchoring of the aforesaid base supporting member 11 to the main upright member 12, the said upper support elements 11c and 11d may be rigidly attached to the member 12 in a suitable manner at the positions shown at 11g and 11h, respectively, in FIG. 1. Also, a steel plate is utilized as indicated at 12 b in FIGS. 1a and 2, to provide additional bracing between the rear end of each side support elements 11a and 11b and the main upright supporting member 12.

Supported to both of the aforesaid base-supporting and main upright support members 11 and 12 are a uniquely situated pair of paced-apart and relatively elongated stationary boom members indicated respectively at 15 and 16. Each of these boom members is supported or anchored in novel manner to the upper span of the previously described main upright supporting member 12 in a specific configuration to be hereinafter described. As seen generally in FIGS. 1 and 2, and more particularly, in FIGS. 6 and 7 of the drawing which represents the identical mount for each of the said pair of boom members 15 and 16, each boom member consists basically of a double set of closely spaced, lower boom elements, as indicated at 15a, for example, for the left-hand boom member 15, and in addition, includes a single upper boom element 15b. As seen clearly in FIGS. 1 and 3, the aforesaid upper boom element 15b (as well as boom element 16b) extends beyond or overhangs the upper span of the upright supporting member 12. This is accomplished in two phases of construction, first, by each boom member 15 and 16 incorporating a relatively elongated portion extending from its rigid support at the bottom end thereof with base supporting member 11 to a point indicated at the reference numeral 17 note FIG. 2) for the left boom member 15, for example, from whence it continues as a considerably shorter portion extending at a somewhat different and lower angle of orientation to thereby form the previously mentioned overhang which terminates at, and is integrally formed to the upper ends of the double set, lower boom element 15a.

FIG. 3 generally, and FIGS. 6 and 7, in articular, show the support provided for the boom member 15, which is identical to that of boom member 16. As seen in the aforesaid FIGS. each boom member is rigidly interconnected or anchored in spaced relation to, and extending over the upper span, indicated at 12a (note FIG. 7), of the main upright supporting member 12 by means of a rigid angular configuration, spaced upright support brace at 18 for the left boom member 15 (as viewed in FIG. 2 for example) with an identical support brace shown at 19 for the boom member 16. Support brace 18 consists, in part, of a pair of divergent brace portions 18a and 18b which respectively are supported on the top surface of the upper span 12a, of the aforesaid main upright supporting member 12. Left support brace 18a is supported directly on the said upper span 12a, whereas right support brace 18b is supported indirectly thereon because of the intervening support plate element 19a which is directly positioned on top of the upper span 12a, as clearly seen in FIG. 7, for example, for the purpose of providing additional support to the upright supporting member 12. In addition to the divergent brace portions 18a and 18b, upright support brace 18 also incorporates a vertical, centrally disposed brace 18c which extends from an affixed position at the juncture between divergent brace portions 18a and 18b to a bottom position on top of, or superimposed over the upper surface of the lower boom elements, as at 15a, for the left boom member 15, for example. The upper boom element 15b thereof is rigidly affixed to the brace member 18 at the position 17, as is the right boom member 16 affixed in identical relation to its support brace (not shown).

The view of FIG. 6 illustrates the additional supporting means uniquely provided for affixing the lower boom elements 15a to the upper span 12a of the main upright supporting member 12. For this purpose, said lower boom elements 15a are rigidly retained to upper span 12a by means of an intermediate spacer element at 21 which precisely interfits in a complementary slot formed within the upper span 12a, as shown. To assist in accomplishing the requisite rigid interconnection therebetween, lower boom elements 15a are affixed in position relative to upper span 12a by the steel plate means indicated at 20 in FIG. 6. In the view of FIG. 7, the brackets indicated at 22 and 23 likewise assist in the rigid attachment between said lower boom elements and top span member.

Figure 4:
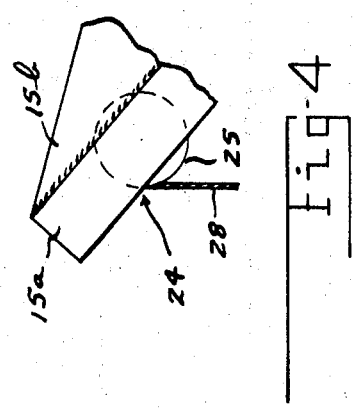
FIG. 4 is a detailed partly broken-away view, illustrating part of the pulley and cable arrangement which is incorporated in each of the stationary boom elements of the invention at the uppermost corner thereof, as is indicated in FIG. 3 by the arrow marked A.
Figure 16:
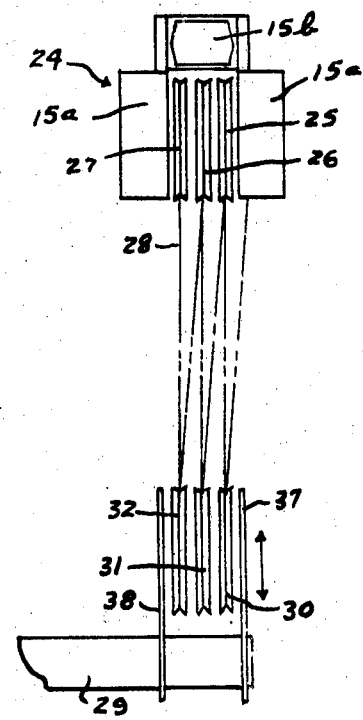
FIG. 16 is a second view, oriented at right angles to the illustration of FIG. 15, and showing additional details of the inventive pulley and cable arrangement thereof.
Figure 17:
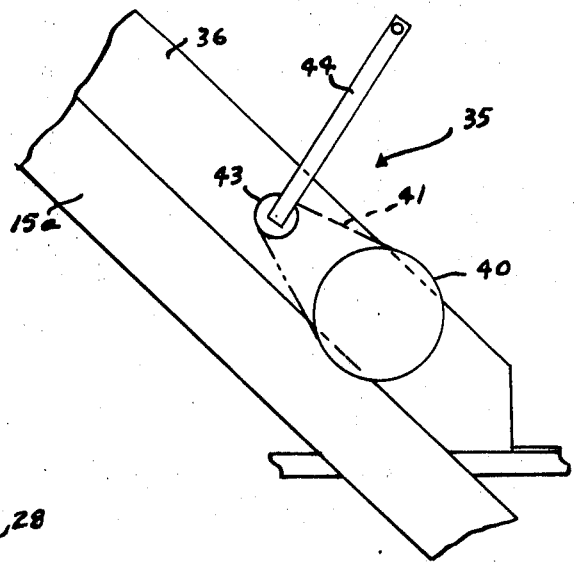
FIG. 17 is a relatively enlarged schematic and broken-away view of the hand-operated crank mechanism that may be utilized to actuate the pulley- and-cable arrangement of FIGS. 15 and 16 to thereby raise and/or lower the crashed aircraft to be moved.

With particular reference to FIGS. 4, 5, 15 and 16, it is noted that a main pulley assembly is mounted within each of the previously described boom members 15, 16, as is indicated generally at the reference numeral 24 in FIG. 4, for example, for the left-hand boom member 15. An identical pulley assembly (not shown) is utilizable for the right-hand boom member 16. The aforesaid pulley assembly 24 comprises preferably of a series of three pulleys, indicated respectively at 25, 26 and 27 in FIG. 16, which are mountable in the lower boom elements 15a adjacent the juncture thereof with the upper end of the upper boom element 15b. In addition, a cable arrangement is used and comprises a total of three wraps of a continuous, preferably ½inch, cable indicated at 28. The free end of the cable 28 is lead, again, in three wraps respectively around a second series of pulleys mounted on a free-floating beam or movable boom member indicated generally at 29 in the somewhat schematic form of FIG. 16. As further illustrated, partly in FIG. 15 and in more detail in FIG. 16, these second-named pulleys, which are indicated at the reference numerals 30, 31 and 32, respectively, are actually mounted adjacent to, and over the right-hand end of the member 29, by means of a pair of spaced rigid upright support brackets at 37 and 38. Of course, an identical pulley and cable arrangement (not shown) is used for the opposite boom member 16, and is interconnected at the other end of the movable member 29. As depicted in FIG. 16, both sets of pulleys are grooved in configuration, and in FIG. 15 it can be seen that the upper free end of the cable 28 is affixed at 33 to a cable anchor element 34 which, in turn, is affixed to a portion of the lower boom elements 15a of boom member 15. The opposite end of cable 28 is directed over the pulleys 25, 26 and 27 to a hand-operated crank mechanism shown generally at 35 in the schematic view of FIG. 17. This hand-operated crank mechanism includes the pulley whose location is indicated by the arrow J in FIG. 3, which pulley is mounted within the enlarged support member 36 that is used to interconnect the lower end portions of the lower and upper boom elements 15a, 15b for their interconnection with the base supporting member 11. Although not specifically illustrated, an identical crank assembly and crank-operated cable is mounted on the right-hand boom member 16 and is operated simultaneously therewith during the lifting thereby of a disabled aircraft.

The said support member 36 is illustrated in more detail in FIGS. 8, 8a and 8b as including a pair of spaced steel plates at 45 an 46, to which is affixed the lower boom elements 15a, as shown, which elements may be made of an I-beam configuration. These steel plates 45, 46 may also include a steel plate spacer between opposite sides of the upper boom element 15b (note FIG. 8a), as indicated respectively at 47 and 48. The lower portion of upper boom element 15b is shown in rigid inserted relation within the rearward end of said support member 36, and is retained therein in indirect contact with said steel plates 45 and 46 by way of said spacer 47 and 48. As illustrated in FIG. 8b, the lower boom elements 15a *straps are affixed in closely-spaced relation to each other on opposite sides of the bottom of said steel plates 45 and 46 and, in this manner, the lower ends of each boom member 15 and 16 are maintained in correct position.*

The previously mentioned free-floating beam, or movable boom member 29 may actually consist of a double beam member comprising elements 29a and 29b respectively mounted as shown in the upright bracket 37 at one end, and an identical bracket (not shown) at the opposite end thereof. Moreover, both the pulleys 25 to 27 and 30 to 32, and the movable boom or double beam element 29 are appropriately sized and are adapted to support, for attachment thereto, any appropriate system of load straps of sufficient strength to support standard types of fighter aircraft. To this end, a set of loading straps (not shown) may be attached in any suitable manner to the said movable boom element 29, which straps may also naturally incorporate a hook device of standard configuration. This hook device may thereafter be attached to an enlarged main loading strap that is adaptable to be placed around the aircraft to be lifted. Neither the loading straps nor the attachment hook are shown or described since many different designs thereof may be utilized without departing from the true spirit or scope of the invention.

Figure 18:
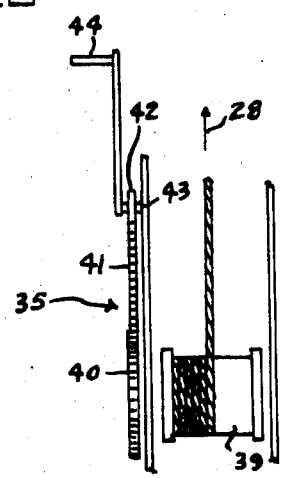
FIG. 18 is a further schematic and broken-away view, oriented at right angles to FIG. 17, and showing additional details of the hand-operated crank mechanism thereof.

To provide for the operation of the previously described pulley and cable arrangements to thereby raise and/or lower the movable boom 29, the said cable 28 for the boom member 15, and its counterpart for boom member 16, is led to the previously noted operating pulley, such as that previously indicated at the position J (FIG. 3) and now assigned the reference numeral 39 in the schematic view of FIG. 18. In the latter FIG., as well as in FIG. 17, the same pulley 39 is shown mounted on the same axis with a relatively enlarged sprocket wheel 40 which, in turn, is driven by the sprocket chain 41. The latter is operated by the relatively small sprocket wheel 42 shown mounted on the shaft 43 of the hand-operated crank 44 of the previously mentioned hand-operated crank mechanism 35. It is noted that the above described chain and sprocket may preferably be arranged in a 20:1 ratio in order to provide the proper power to thereby actuate cable 28 and thereby lift the disabled aircraft through the previously described pulley and cable assembly.

Figure 10:
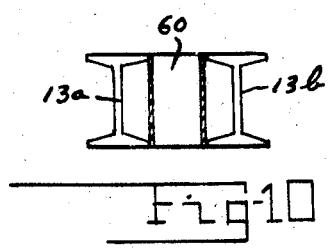
FIG. 10 is a cross-sectional schematic view, taken about on line 10—10 of FIG. 9, illustrating further details of the forward or front portion of the hoist assembly of the invention.
Figure 9:
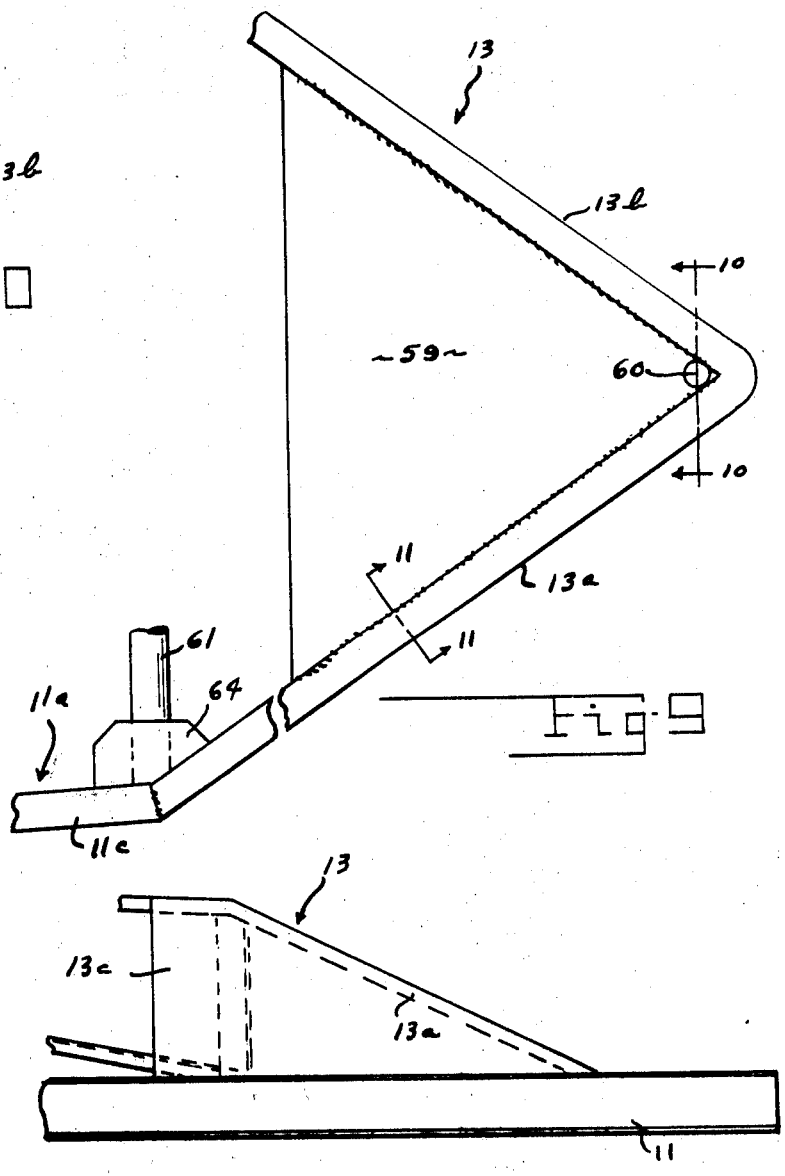
FIGS. 9 and 9a, respectively, represent relatively enlarged, and partly broken-away plan and side elevational views of the front or forward portion of the hoist assembly of the present invention.
Figure 9A:
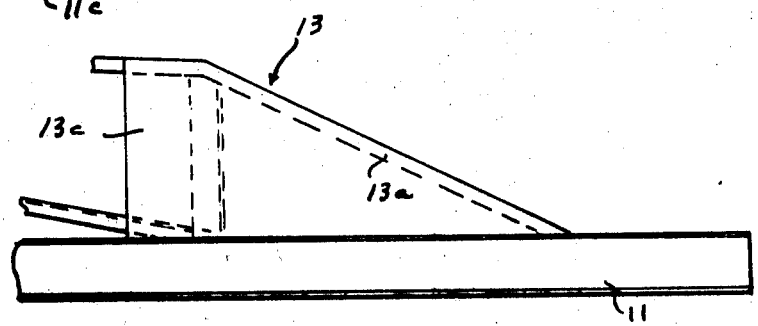
Figure 11:
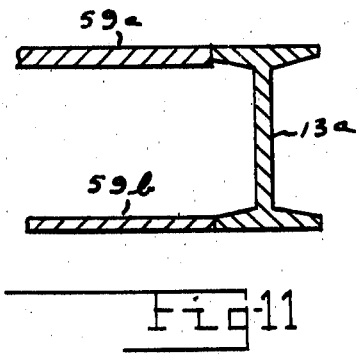
FIG. 11 is a second cross-sectional view, partly broken-away, taken about on line 11—11 of FIG. 9, illustrating details of the reinforcement for the front portion of FIG. 9.

In the previous description of FIGS. 1—3, it was hereinbefore noted that the present hoist or lifting rig assembly 10 included a forward or front end hoist assembly portion 13. This portion is shown in a relatively enlarged configuration in both plan and side elevational views, respectively, in FIGS. 9 and 9a. As illustrated in the latter FIGS. said forward or front end portion 13 includes a pair of side supports at 13a and 13b which respectively extend from a substantially single position in rigid support on the previously noted base-supporting member 11 and extend both upwardly and rearwardly to a point of integration with the upper support elements, one of which is shown at 11c, for the base-supporting side elements 11a and 11b. A steel plate may also be utilized as shown at 13c for providing additional bracing to the forward of front hoist assembly end 13, which brace 13c extends between the top and bottom portions thereof. In FIG. 9, it is clearly illustrated that still further bracing is assured at the said forward or front portion 13 by means of the transversely extending element at 59, which may consist of a suitably sized steel plate. In the cross-sectional views of FIGS. 10 and 11, there is respectively shown the I-beam construction that may be applied to the said side-support elements 13a, 13b and the interconnecting steel pipe 60 rigidly formed therebetween (FIG. 10) and which provides a suitable opening adapted to be engaged with an appropriate tow device of a tow vehicle, and the more detailed view of the aforesaid transversely extending steel plate 59 which is shown clearly in FIG. 11 as actually consisting of two spaced-apart plate portions 59a and 59b formed between both bottom and top surfaces of forward or front end portion 13. The present hoist assembly 10 includes certain additional bracing members. These include a first steel pipe at 61 (note FIGS. 1 and 9) which extends transversely across the base supporting member 11 at its integral juncture with the forward end portion 13, a second transverse member extending parallel to the pipe 61 and between opposite side elements 11a and 11b, as indicated at the reference numeral 62 in FIG. 1, and a third transverse brace and supporting member at 63 extending between opposite stationary boom members 15 and 16. Also, the previously described front hoist assembly end portion 13 incorporates an additional brace element, indicated at 64 in FIG. 9, which is used to reinforce the corner or juncture between the front end portion 13 and the base supporting member 11.

FIG. 12 illustrates a modified form of the invention in which the lifting rig assembly 10 is made collapsible in form to thereby provide for easier transportation thereof by most transport-type of aircraft. This is accomplished by using a series of hinge mechanisms at appropriate joints between major components of the invention. Also, to provide for a more stable lifting platform, a water ballast tank may be incorporated within the front or forward end portion 13, as indicated generally at 49 in FIGS. 1 and 12.

To make the invention collapsible and thereby provide for greater compactibility in the present lifting rig assembly 10 and thus further improve its air transportability, the previously described main upright supporting member 12 may be equipped with either a hydraulic jack, or may utilize a removable section in the middle thereof, or in the area indicated generally by the numeral 50 in FIG. 1. In this manner, the aforesaid side framework 11a, 11b may be folded inwardly to a more compact position provided, of course, an appropriate hinge mechanism of any suitable configuration is incorporated at the forward end of each member 11a, 11b or in the area indicated by the reference numeral 51, which is the point of rigid juncture between the forward or front hoist assembly end portion 13 and the base supporting member 11 in the inventive form of FIGS. 1—3.

The hinge mechanisms previously mentioned may include a first hinge mechanism indicated generally at 52 in FIG. 12 and, in particular, in FIG. 13. As seen in the latter FIG., the mount between the lower boom element 15a and the top span 12a of the main rectangular-shaped upright supporting member 12 is modified to incorporate the hinge mechanism at 52. Thus, boom element 15a is no longer rigidly mounted on the top span of the rectangular supporting member 12 as in the form of FIGS. 1—3 but, instead, is mounted to an offset portion, indicated at 53, of the aforesaid hinge mechanism 52, about the pivot 54. The hinge mechanism 53 is itself rigidly affixed to the top surface of the upper span 12a, and, as a result, the boom members 15 and 16, each being equipped with such a hinge mechanism, as at 52, may then pivot relative to the supporting member 12.

Figure 14:
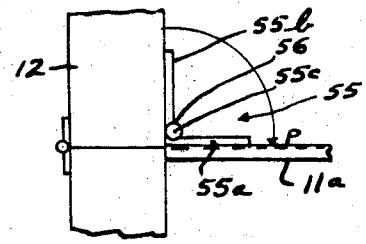
FIG. 14 is another relatively enlarged and somewhat schematic view, showing details of a second hinge mechanism to be used with the modification of FIGS. 12 and 13 at the position marked F.
Figure 15:
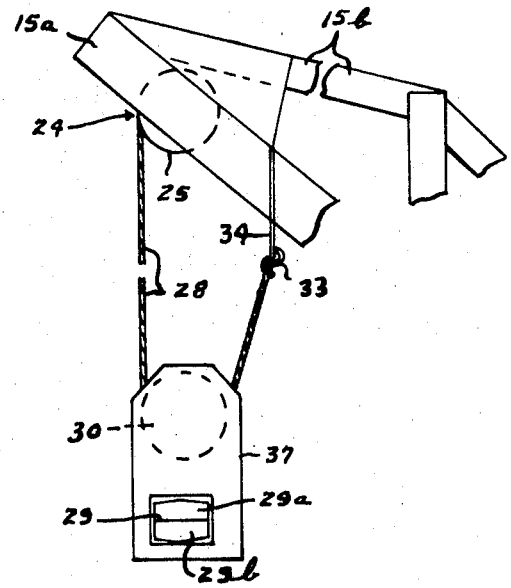
FIG. 15 is still another relatively enlarged and somewhat schematic view, illustrating details of the pulley and cable arrangement utilizable with both the invention of FIGS. 1 and 3 and the modification of FIG. 12.

To complete the improved flexibility imparted to the second form of the invention, a second hinge mechanism is provided at 55 (note FIGS. 12 and 14). The hinge mechanism 55 comprises a second hinge device 56 which is incorporated in the main upright supporting member 12 at the position indicated in FIG. 12, which is located somewhat above the relatively enlarged set of wheels formed on the rear end of the base supporting member 11, as is indicated at 57. In this connection, to complete the rolling support for the present rig assembly a dolly wheel is mounted as indicated at 58 just forwardly of each of the relatively enlarged wheels 57 and, in addition, a truck comprising a pair of relatively small wheels is mounted in the forward portion of the present assembly, as is indicated at 59. The aforesaid hinge mechanism 55 consists of a fixed hinge portion 55a which may be mounted in fixed relation to the top surface of the side-supporting elements of the base supporting member 11, one of which is indicated at 11a in the said FIG. 14, and a movable hinge portion at 55b which is fixed to the upright supporting member 12 and is pivoted to said fixed hinge portion 55a about the pivot at 55c. Thus, the upright member 12 may be pivoted in the direction of the arrow P to a lower, substantially horizontal position, while at the same time, the boom members 15 and 16 will pivot about their respective hinge mechanisms, such as that indicated generally at 52 in FIG. 13, to the phantom line position shown in schematic and broken-away form. A pair of hydraulic jacks, one of which is shown at 76 in FIG. 12 may be used to move the upright member 12 between raised and lowered positions.

Although a preferred embodiment of the invention and one modification thereof has been shown and described, it is obvious that many other modifications and changes may be made thereof without departing from the true spirit or scope of the invention.

I claim:

1. An aircraft hoist assembly for lifting various loads up to and including disabled aircraft crashed on the active portion of an aircraft runway, comprising: a first, main, upright load-supporting means adapted to indirectly support the aircraft or other load to be lifted; a second, base-support means incorporating a pair of relatively elongated, open-framework and raised side support members terminating at a front end portion thereof in a reinforced front end hoist assembly portion incorporating a counterweight means and adapted to be interconnected with a tow vehicle, and further being rigidly interconnected at the other, rear end thereof with the bottom portion of said first main, load-supporting means to thereby retain said first means in its upright and indirect load-supporting position; and a third, combined direct load-supporting, and lifting and lowering means positioned in supporting relation between said second, base support means at a lowered end portion thereof and said first, main, upright indirect load-supporting means at an upper end portion thereof, the latter end portion extending in overlapping relation to the upper surface of said first, indirect load-supporting means and terminating in a relatively short, load-supporting position section adapted to be vertically disposed directly over, and in releasable engagement with the disabled aircraft or other load to be hoisted when said hoist assembly is brought into the correct load-lifting position on the aircraft runway; said third, combined direct load-supporting, and lifting and lowering means comprising a main, collapsible support structure, a first, free-floating, rigid load-supporting and intermediately positioned beam member suspended in depending relation from said main support structure and further adapted to be releasably attached to the disabled aircraft or other load to be raised and/or lowered; and a second, partially flexible, and manually controlled and operable, load-raising and lowering actuating means interconnected with said free-floating beam member and being further integrally mounted to said main support structure, said actuating means being manually operable to effect raising and lowering of said beam member and any disabled aircraft or other load interconnected therewith; said third, combined direct load-supporting, and lifting and lowering means including a pair of spaced-apart boom members each rigidly supported at the lower end thereof to said second, base support means and each further comprising a pair of elongated straight, lower boom elements extending from the said rigid, lower end-supporting position rearwardly and upwardly to an overlapping relation relative to the upper surface of said first, main upright load-supporting means to thereby terminate in a position adapted to be vertically disposed over the load to be raised; and a single, upper boom element having a first, straight portion similarly extending rearwardly and upwardly from a forward position in rigid attachment with said second, base-support means to thereby terminate in an integral interconnection with the rearmost ends of said pair of lower boom elements; said assembly further having a pair of identical upright support brace members rigidly affixed to the upper surface of said first, main indirect load-supporting means in spaced-apart relation to each other for respectively supporting each of said boom members in rigid and overlapping relation thereto; each of said upright support brace members comprising a pair of straight brace elements rigidly affixed to, and extending further upwardly, and in divergent relation from the top surface of said first, load-supporting means; and a third, vertically disposed brace element rigidly affixed to the said pair of lower boom elements and extending upwardly to a position of inter-'connection with, and thereby forming a rigid junction between the upper end portions of said pair of straight brace elements comprising each of said pair of upright support brace members.

2. An aircraft hoist assembly as in claim 1, and combined boom-member-interfitting and -supporting means for rigidly interconnecting each of said pair of boom members to said first, main upright load-supporting means, including: first, spacer means affixed to, and interposed in close fitting relation between the bottom surfaces of each of said pair of lower boom elements and slotted portions formed in the upper surface of said first, load-supporting means; second, plate element means spaced from the said first, spacer means and rigidly interconnected between said lower boom elements and said load-supporting means; and third, bracket means disposed on opposite sides of each pair of lower boom elements in rigid interconnection with said main load-supporting means upper surface, thereby providing and ensuring still further reinforcement to the rigid support for said pair of boom members.